United States Patent [19]

Cramer

[11] Patent Number: 5,251,142
[45] Date of Patent: Oct. 5, 1993

[54] RIP FENCE OF TABLE SAW WHICH MAY BE POSITIONED BY COMPUTER CONTROL

[75] Inventor: Fred C. Cramer, Allegheny County, Pa.

[73] Assignee: Digital Cutting Systems, Inc., Bethel Park, Pa.

[21] Appl. No.: 627,409

[22] Filed: Dec. 14, 1990

[51] Int. Cl.⁵ .................. G06F 15/46; B26D 5/00
[52] U.S. Cl. .................... 364/474.13; 83/75.5; 83/76.8; 83/76.9; 364/474.09
[58] Field of Search ............ 364/474.09, 474.13, 364/474.22–474.27, 188, 189, 474.01, 474.02; 83/75.5, 72–76, 76.1–76.8, 373, 789, 802, 438, 520, 522.11, 522.12, 522.15, 467.1, 935, 268; 144/356, 357

[56] References Cited

U.S. PATENT DOCUMENTS

| | | | |
|---|---|---|---|
| 3,610,299 | 10/1971 | Jureit et al. | 83/76.4 |
| 4,521,006 | 6/1985 | Waters | 269/304 |
| 4,596,172 | 6/1986 | Visser | 83/75.5 |
| 4,628,459 | 12/1986 | Shinohara et al. | 364/474.15 |
| 4,639,653 | 1/1987 | Anderson et al. | 318/599 |
| 4,641,557 | 2/1987 | Steiner et al. | 83/76.7 |
| 4,702,134 | 10/1987 | Corley, III | 83/75.5 |
| 4,750,105 | 1/1988 | Ohkawa et al. | 364/191 |
| 4,788,481 | 11/1988 | Niwa | 318/600 |
| 4,792,889 | 12/1988 | Kragelin et al. | 364/191 |
| 4,866,630 | 9/1989 | Beaman et al. | 364/474.02 |
| 4,887,219 | 12/1989 | Strauser | 364/474.09 |
| 4,896,273 | 1/1990 | Moore et al. | 364/505 |
| 4,939,635 | 7/1990 | Seki et al. | 364/191 |

*Primary Examiner*—Joseph Ruggiero
*Attorney, Agent, or Firm*—Buchanan Ingersoll; George P. Baier

[57] ABSTRACT

A mechanism for providing computerized control of both a rip and a crosscut fence for a table saw is disclosed. The device is adapted to utilize the output of an optimization program to accurately and economically permit the user to cut sheet stock. A personal computer is utilized to determine an optimum cutting pattern in a preselected series of patterns for a preselected inventory of finished pieces. The computer arranges the finished pieces on the inventory of sheets and displays graphically the intended output to the user. The user selects the cuts in the provided sequence and the personal computer through the use of mechanical interfaces accurately positions the fences of the table saw for each successive cut. The mechanism may also allow manual entry of selected cuts by the user.

28 Claims, 3 Drawing Sheets

Fig. 5.

CP2A (v6.8-015875) ------------------------------------------------- Cutlist (001)
( 0.030) SCC THREE MAN DESK BARREL OAK VERTICAL LAMIN   4:37 pm  Jul 31, 1990

Pattern 12. Cut 1 Sheet(s), 1 Cycle(s).   88.89% Yield
(48.250) X (96.250) VERT.GR. LAM.-CROSS

•••••••••••••••••••••••••••• Short Rip Pattern •••••••••••••••••••••••••••• ← 140

| Prt | Repeat | Rip Cut | Phs Repeat | Cross Cut | Phs Repeat | Re-Rip Cut |
|---|---|---|---|---|---|---|
| 33 | (01) | 23 | (03) | 15 | | |
| 33 | (01) | 23 | (01) | 15 | | |
| 32 | | | (01) | 22 | | |
| 3 | | | (01) | 9 | (01) | 22 1/4 |
| 26 | (01) | 47 | (01) | 21 1/2 | | |
| 11 | | | (01) | 7 1/2 | (01) | 45 1/2 |
| 33 | | | (01) | 15 | (02) | 23 |

} 155

•••••••••••••••••••••••••••• Short Rip Pattern •••••••••••••••••••••••••••• ← 140

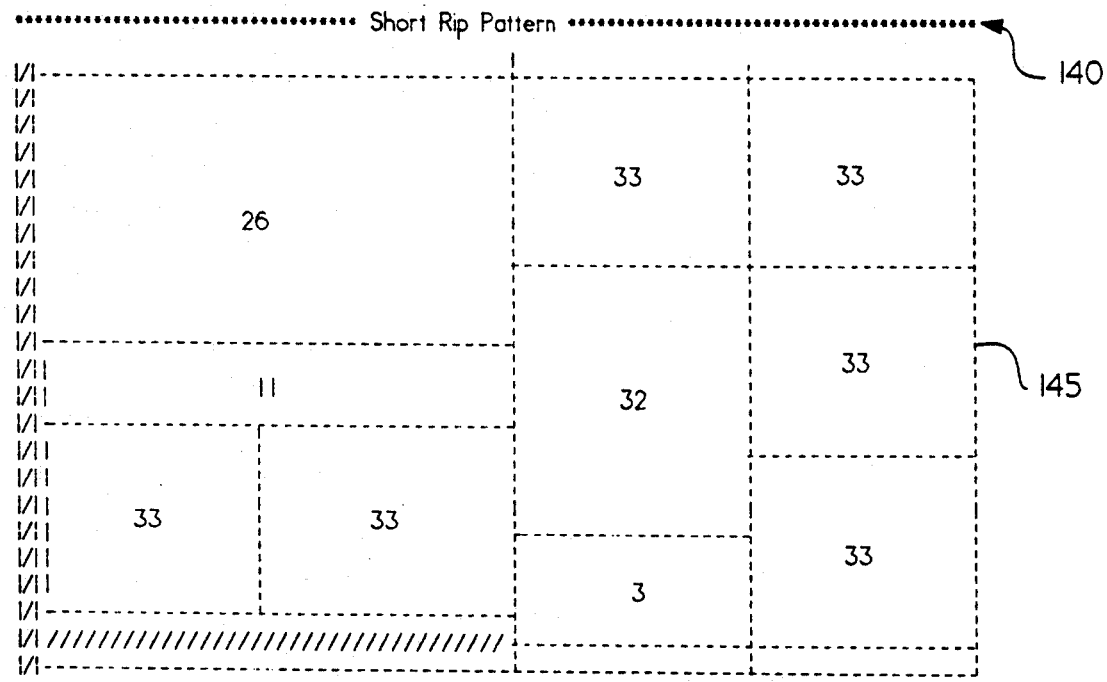

145

| Prt Num | Per P Sheet | Per Pattern | To Be Cut | Width | Length | Description |
|---|---|---|---|---|---|---|
| 3 | 1 | 1 | 0 | 9.000 | 22.250 | L. BACKS ENDS |
| 11 | 1 | 1 | 3 | 7.500 | 45.500 | STRETCHER SIDES |
| 26 | 1 | 1 | 2 | 21.500 | 47.000 | TOP CAB INTERIOR |
| 32 | 1 | 1 | 4 | 22.000 | 23.000 | SLOPED SHELVES MIDDLE |
| 33 | 6 | 6 | 6 | 15.000 | 23.000 | PULL OUT SHELVES |

} 160

RIP FENCE OF TABLE SAW WHICH MAY BE POSITIONED BY COMPUTER CONTROL

BACKGROUND OF THE INVENTION

1. Field of the Invention

This invention relates to a motorized movable fence for a table saw. More particularly, this invention relates to a fence which is moved under the direction of a computer program and which is sequentially positioned according to an optimized cutting sequence.

2. Description of the Prior Art

A number of motorized fences for a table saw have been proposed to assist the woodcutter in accurately positioning a section of sheet to be cut with relation to the saw blade. Furthermore, a number of devices have been proposed which utilize a computer to accurately position the fence to its designated location.

Jureit, U.S. Pat. No. 3,610,299 discloses an automated saw in which means are provided for automatically selecting the appropriate set of dimensions and angles to be used in accordance with a preselected sheet width. The dimensions of the work piece are entered numerically to provide accurate and repeatable cutting.

Furthermore, a number of other devices have been proposed which utilize computer controlled cutting or machining under computer control to insure accuracy and to increase productivity. Motorized controls of these devices and of table saw fences in particular, are also well known.

It is desirable in the preparation and cutting of wood sheet products that the wood sheet material be cut accurately and with as little wastage as possible. In many wood working applications, a series of sheets must be cut in an identical fashion to provide all of the construction elements necessary for the completion of the project. Heretofore, this process was accomplished by manually mapping a series of sheets with the necessary cutting patterns and rearranging the patterns to minimize the wood utilized. The sheets would then be marked and cut manually by the operator of the table saw.

The cutting operation is accomplished in a manual table saw by selecting the width of sheet to be cut and moving a fence to that predetermined distance from the saw blade. The table saw itself is generally provided with a movable fence which may be manually adjusted through sliding and clamping or by a gear drive or similar electrical mechanism. In any event, the fence must be carefully placed for accurate cutting. Similarly, the sheets must be accurately marked for the same reasons.

With the advent of inexpensive personal computer power, a number of sheet cutting optimization programs such as Cut Planner 2A by Pattern Systems International or Cut Rite Plus by Holzma US have been produced. These programs permit the input of an inventory of sheet stock and the input of the dimensions for the finished cut pieces to be utilized in a project. The computer program then arranges and rearranges the cut pieces on the existing sheet stock to maximize utility and minimize wastage. A "cutting list" is then provided to the user in order to mark his sheets according to the program. While this permits the user to minimize wastage, it does not provide or assist in the accurate cutting of the sheets according to the computer output. There remains, therefore, a need in the art for a device which combines the accuracy and repetitive capabilities of a table saw utilizing a motorized fence and the accuracy and economy of a computerized sheet cutting optimization program.

SUMMARY OF THE INVENTION

A table saw device is disclosed which utilizes the data output of an optimization program for the cutting of sheet stock, particularly those made of wood or other similar materials. This output is utilized to sequentially position the fence or fences of a table saw for accurate cutting of the wood stock. The optimization program receives data regarding the inventory of sheets available and the necessary cut output for a given project. The optimization program provides a cutting list and a graphic representation of the sheets to be cut. It further provides electronic data output which may be utilized to position the fences according to the cutting list.

The device is provided with a CPU and data storage means for the operation of the optimization program and the direction of the necessary fences. A monitor is provided to provide the cutting list and graphical representation of the cuts to the user. The CPU is electronically attached to a series of motors for the movement of the fences through interfaces which are adapted to permit the motorized fences to be controlled thereby. The interfaces receive electrical output from the CPU and translates that information according to a preset standard to the motors for accurately and repetitive positioning with relation to the saw blade.

Each motorized fence is provided with a plurality of sensors for detecting its position with relation to the end of its travel and preferably some other baseline position.

The fences themselves are mounted on guides which are fixed to the table saw. At least one fence is provided, although in the preferred embodiment two such fences are utilized. These are referred to as the rip fence, which is the primary fence, and the crosscut fence, which is the secondary fence. The rip fence is preferably mounted on a bar which is unmovably mounted to the table saw housing. The rip fence housing is slidably mounted upon the bar and contains the motor which enables its movement. The motor is provided with some type of drive mechanism which permits the motor to accurately move the fence in a repeatable manner along the length of the bar. The fence itself is slidably mounted to the housing and may be electronically or mechanically locked into a fixed position for cutting. The housing is further provided with sensors to detect the end of travel at each end of the bar and a home position from which all other measurements may be calibrated.

The second or crosscut fence is preferably mounted on a sliding platform upon which a wood panel may be laid and which moves relative to the saw blade and the housing of the table saw. The crosscut fence is similar to the rip fence in that it is movable along a bar and is provided with sensors to detect the end of travel and home positions.

In the preferred embodiment, the crosscut fence is moved along the length of the bar through the use of a toothed rubber belt. The toothing of the belt provides the necessary accuracy for the repeatable movement of the crosscut fence.

While the rip fence bar is movable relative to the rip fence housing and may be locked into a particular position, the crosscut fence is pivotal with relationship to the crosscut fence housing and may be moved in an upward fashion away from the cutting surface. This permits the positioning of large sheets on the cutting surface without having to avoid the crosscut fence which extends thereover.

These and other advantages and features of the present invention will be more fully understood with reference to the presently preferred embodiments thereof and to the appended drawings.

BRIEF DESCRIPTION OF THE DRAWINGS

FIG. 5 is a representation of the graphical output of the computer control.

DESCRIPTION OF THE PREFERRED EMBODIMENTS

Figure 1:
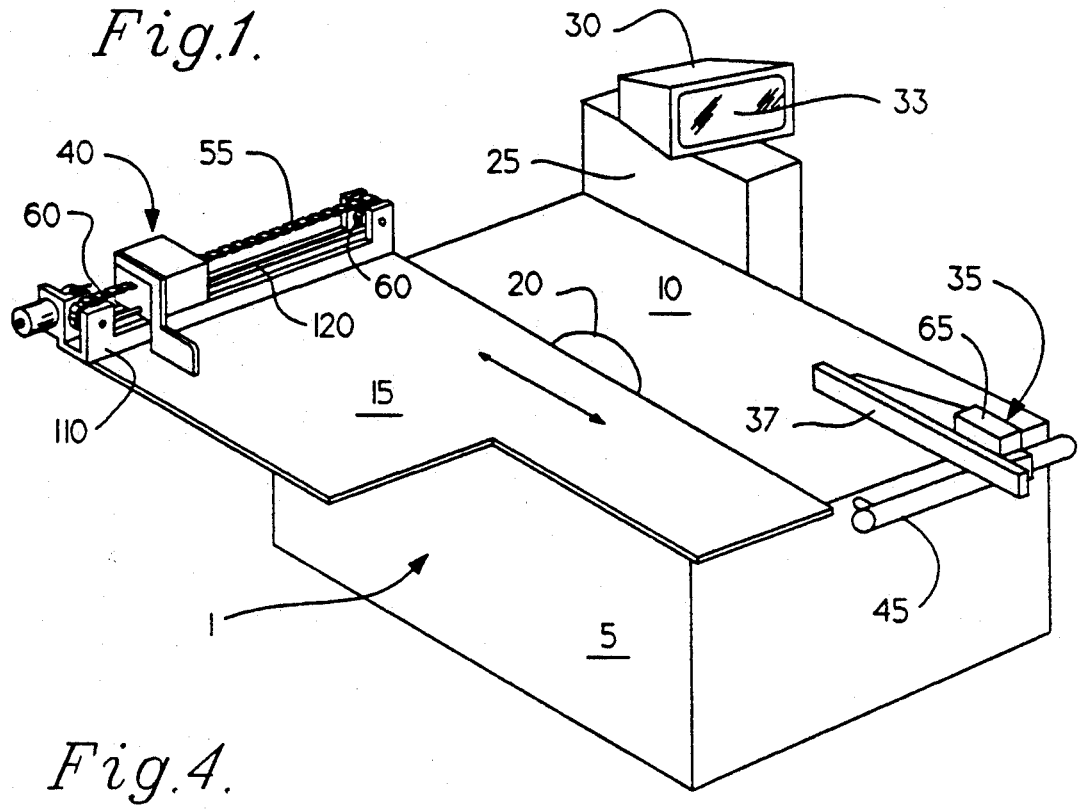
FIG. 1 is an isometric view of the table saw with a rip fence and a crosscut fence.

Referring to FIG. 1, the table saw 1 is illustrated having a base 5 and a stationary table surface 10. A sliding table 15 is provided which is movable relative to the base 5 in the direction of the bidirectional arrow. Saw blade 20 is positioned between the stationary table surface 10 and the sliding table 15, and cuts parallel thereto. In this way, a sheet may be placed on sliding table 15 and the sheet and sliding table 15 may thus be moved as a unit with relation to saw blade 20 This assists in the accurate and regular cutting of the sheet.

The CPU 25 which is itself comprised of a processor and non-volatile memory, may be mounted at any location, but is preferably mounted in close proximity to the table saw 1. A protective cover for the CPU and the other electrical components is recommended, to prevent the entry of sawdust or the like into the devices. A monitor 30 is positioned near the user's standing position to permit easy access thereto. The monitor 30 has a touchscreen 33 which enables the user to operate the device without a keyboard. A keyboard (not shown) may be utilized to enter data as well.

The rip fence mechanism is preferably mounted on the near edge of the stationary table 10, as viewed in FIG. 1. The crosscut fence mechanism 40 is preferably mounted on the far end of the sliding table 15, as shown in FIG. 1.

Figure 2:
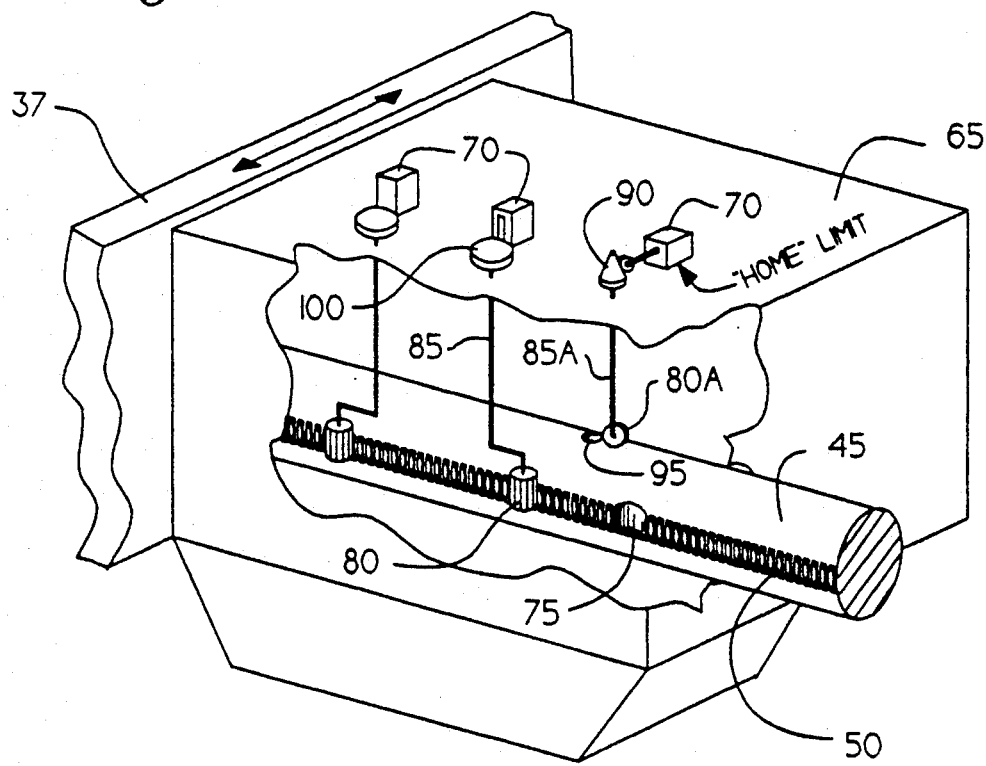
FIG. 2 is an isometric view in partial section of the rip fence housing.

Referring to FIGS. 1 and 2, tracking and squareness of the rip fence mechanism 35 is maintained through the use of a rigidly constructed steel support rod 45. The support rods are bolted to the stationary table 10 at a minimum of two points so that straightness and flatness can be finely adjusted. Integral to the support rod 45 is a precision machined gear track 50 running the full length of the rod.

Figure 3:
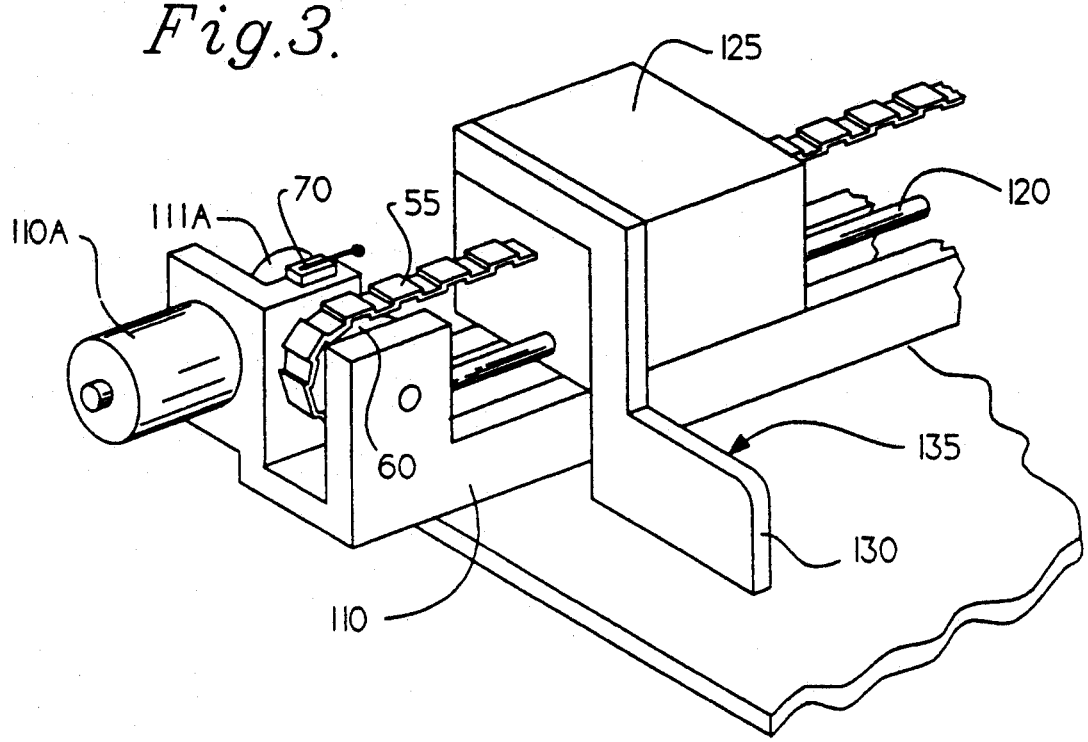
FIG. 3 is an isometric view of the crosscut fence housing and track.

Referring now to FIGS. 1 and 3, the crosscut fence mechanism 40 utilizes a flexible toothed belt 55 which is accurately positioned on a pair of toothed pulleys 60 as the drive mechanism. It should be specifically noted that either embodiment may be utilized for either fence mechanism.

According to the first embodiment, as illustrated by the rip mechanism 35, the rip fence carriage frame 15 is a steel machined structure. Within the confines of the frame, a pinion gear assembly (not shown) is mounted in anti-friction ball bearing journals. The pinion assembly engages the gear rack 50 and provides the positive transport control for the fence. Snap style limit switches 70 are also mounted on the fence carriage frame and are designed to sense the end of travel limits and the home position of the fence. The rip support rod 45 is provided with end of travel indentations at each end thereof. As shown in FIG. 2, the rightmost end of travel indentation 75 is illustrated. A rolling sensor wheel 80 is positioned to travel along the length of the rip support rod 45. When the end of travel indentation 75 is encountered, the sensor wheel 80 dips inwardly into the depression. This rotates the sensor rod 85 which in turn rotates the cam 100. The rotation of the cam then trips the end of travel limit. This discontinues the operation of the rip fence. A similar switching mechanism (not shown) is provided at the other end of the support rod 45. A physical stop (not shown) is also employed as a prevention against the rip fence mechanism 35 from driving off of the edge of the support rod 45.

A home position is also provided for the rip fence mechanism. This permits the device to return to a standard position which is removed from its end of travel position. The home position is marked by a home position indentation 95 in the support rod 45.

A sensor assembly 80 is provided to sense the location of home position indentation 95. The sensor nose 80A travels along support rod 45 and dips downwardly when the marker is encountered. This lowers the sensor rod 85A attached thereto, withdrawing the conical cap 90 from engagement with the limit switch 80 which allows the rip fence mechanism 35 to sense the precise lowest point of the home position indentation 95.

The rip fence bar 37 is slidably mounted on rip fence carriage frame 65. It may be locked in place by any conventional means. The rip fence bar 37 is movable in the direction of the arrows shown in FIG. 2.

On the top of the carriage assembly, a drive unit (not shown) is mounted, consisting of a precision inline spur gear reducer and micro-stepper motor. The stepper motor is preferably designed and sized to provide a total restraining force of 120 lbs. at the fence bar when the motor is at rest with power on. The motor and gear reducer are close coupled to the gear assembly and provide the motive force to operate the rip fence mechanism 35. Fence speed and rates of acceleration and deceleration are programmable through the motor controller. The preferable high speed operation of the fence traverse is set for 50 feet per minute. Rates of acceleration and deceleration are determined by the mass of the fence assembly compared to the capacity of the motor and drive selected.

Referring to FIGS. 1 and 3, the table saw 1 is further provided with a second movable assembly in the form of a crosscut fence mechanism 40. A crosscut support frame 110 is mounted generally parallel to the rip fence mechanism 35 but along the rear edge of the sliding table 15. The sliding table 15 is generally coplanar with the stationary table surface 10 of the table saw 1 and is displaceable in the direction of the arrow.

The crosscut fence mechanism 40 is generally supported on a crosscut support rod 120 which extends perpendicular to the cutting edge of the saw blade 20 and perpendicular to the travel of the sliding table 15. The support rod 120 is circular in cross section and has a smooth surface to permit sliding of the crosscut fence carriage 125 on it. The support rod 120 is of sufficient rigidity to enable the crosscut fence carriage to be mounted upon and maintain its registration with respect to the saw blade 20 at all points in its motion. The support rod 120 is supported a preselected distance above the surface of the sliding table 15 and is supported on the panel by structural support members at each end. The support members and the support rod 120 are each securely bolted to each other and to the sliding table 15 to ensure uniform squareness and registration at all times.

The movable crosscut fence carriage 125 is slidably mounted on the support rod 120 such that it may be displaced along the entire length of the support rod 120. The crosscut carriage 125 is provided with a bore therethrough, which slidingly surrounds the support rod when the carriage is mounted thereon. The movement of the crosscut carriage 125 is physically constrained at each end of the support beam by the structural support members.

Mounted on the crosscut carriage 125 is a crosscut fence stop 130 which is hinged to the crosscut carriage 125. The crosscut fence stop 130 is precisely positioned such that its leading face 135 is perpendicular to the surface of the sliding table 15 upon which the crosscut carriage 125 is mounted, and such that the leading face 135 is parallel to the cutting plane of the table saw blade 20. The crosscut fence stop 130 is hinge mounted to the crosscut carriage 125 so that it may be moved from a first position, in which the crosscut fence stop 130 is lowered to engage a workpiece, to a second position, in which the crosscut fence stop 130 is swung away from the usable surface of the sliding table 15. In this manner, should the crosscut fence stop 130 not be necessary for a cutting operation, it may be moved from the cutting area to allow freer positioning of the workpiece on the sliding table 15. The hinge arrangement allows the crosscut fence stop 130 to be moved from the first position to the second position while retaining its accurate parallel registration with the saw blade.

The crosscut fence carriage 125 is mechanically displaced relative to the saw blade 20 by a notched or toothed belt 55 and associated notched or toothed pulleys 60. A stepper motor 110A which is similar to that provided for the rip fence mechanism 35, is mounted at one of the two mounting blocks which support the crosscut carriage support bar. A series of toothed gears 111A are provided to transmit the rotational motion of the stepper motor to one toothed pulley 60 which is also mounted on the same mounting block. A second, similar toothed pulley 60 is mounted on the opposite mounting block. Toothed belt 55 is extended between the toothed pulleys 60 and the rotation of both pulleys 60 and the belt 55 permit the displacement of the belt 55 in a uniform fashion. The notching of the belt 55 allows it to remain registered relative to the pulleys 60 and the stepper motor during its operation. The crosscut fence carriage 125 is also mounted to the belt 55. Displacement of the belt 55, therefore, causes similar displacement of the crosscut frame carriage 125 along the length of the support rod 120. The belt 55 is mounted to the crosscut carriage 125 in such a fashion that the registration of the carriage 125 with relation to the movement of the stepper motors is not lost during its displacement. Thus, the stepper motor may be utilized to accurately displace and position the crosscut fence carriage 125 and the crosscut fence member 130 along the length of the support rod. The use of a stepper motor also assists in the accurate movement of the crosscut fence member 130 given a steady and known input voltage.

A series of electrical limit switches 70 are also provided on the movable crosscut carriage. End of travel limit switches 70 are provided at each end of the crosscut support frame 110 such that when the crosscut fence carriage 125 is at either of its extreme travel positions along the support rod 120, one of the two limit switches will be activated by engagement of the carriage 125 with the limit switch 70 mounted on the adjacent mounting block of the support frame 110. A home limit switch (not shown) is provided to detect the home position of the crosscut carriage 125. This limit switch is also mounted on one end of the crosscut support frame 110, but extends farther into the zone of movement of the carriage 125. The home position is therefore provided at a small distance from one of the two ends of travel of the crosscut carriage 125.

A video monitor 30 is preferably used in conjunction with an infrared touchscreen 33 as a data input means 34 to provide the operator control link with the fence mechanisms. A keyboard may also be utilized. Coordinated with the various graphics screens presented in the control program, touchscreen technology provides a "user friendly" environment. All commands for location and positioning of the fences 37 and 130 are input through the touchscreen 33 to access preprogrammed moves which are resident in the control program. Drivers written for the touchscreen's control functions remain resident in the computer's memory while the system is operating. This allows for optimum response time of the screens and touchscreen 33.

The monitor 30 is preferably mounted in close proximity to the table saw 1. A fabricated boom and mast mechanism (not shown) may provide the operator with easy access for selecting dimensions without having to move from his normal operating position. Cabling from the monitor 30 may be fed along the boom, down the mast to the CPU 25 mounted on the floor beside the table saw 1 to prevent interference with the cutting operation.

Figure 4:
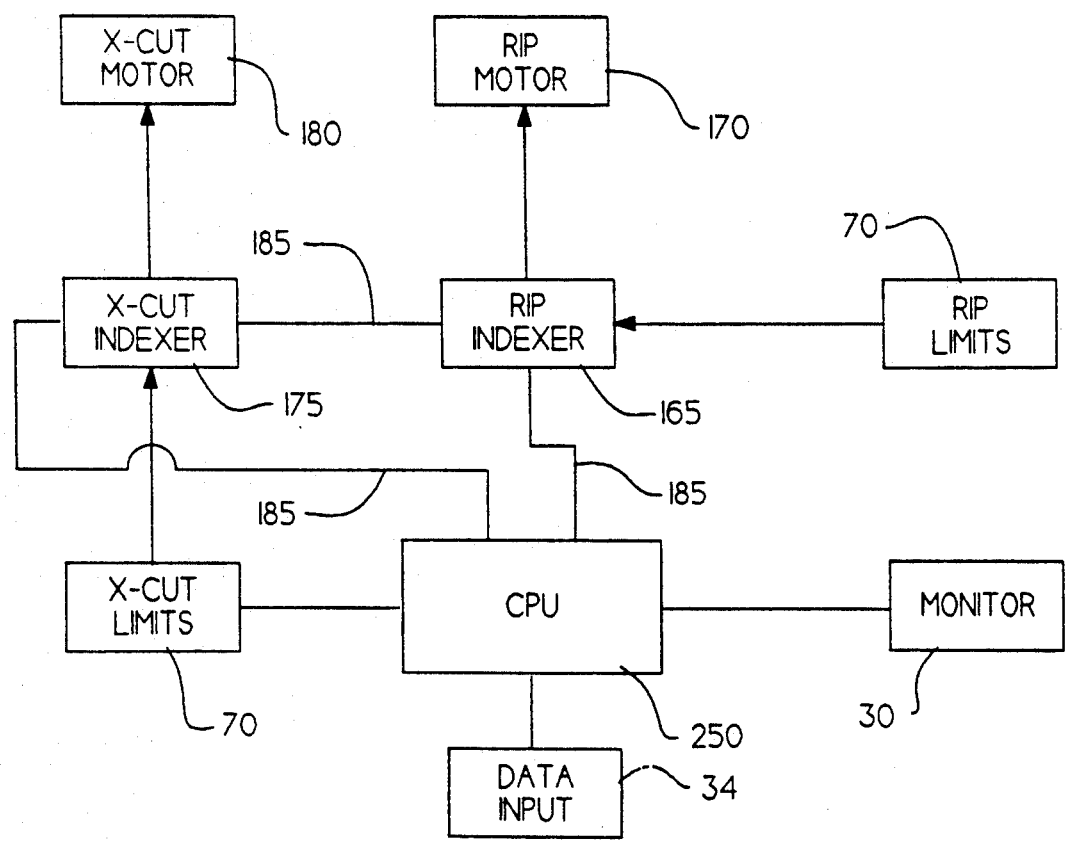
FIG. 4 is a diagrammatic view of the wiring of the table saw device.

Referring to FIG. 4, the electrical control system for each fence consists of a stepper motor, a motor power supply and a controller/indexer. This rip system comprises a rip indexer unit 165 and a rip motor 170. A crosscut indexer unit 175 is daisy-chained to the rip indexer 165 and provides control for a crosscut motor 180. Each motor's activity is limited by the limit switches 70 which are input to the indexer 165 and 175. This system is commercially offered as a packaged unit such as the Compumotor AX microstepper drive. Although these units are used without modifications, the controller and indexer units require additional programming to provide proper control of the fence mechanisms. Control is provided from the CPU 25 to the indexers through an RS-232 computer interface 185.

A personal computer is utilized as the CPU 25 to store the system control programs and execute the various moves made by the fences 37 and 130. A bus style system board is utilized in conjunction with "Flash" memory of EEPROM chips integral to the system board or by hard disk drive. This provides non-volatile memory for the executable code with the option of reprogramming the system as program updates are made available. An I/O board is utilized with primary and secondary serial ports for use in connection to the touchscreen and monitor and the RS-232 port of the motor controller.

All regular operations of the fence control system are driven through menus presented on the touchscreen 33.

A keyboard, however, may be utilized as the data input means 34 to enter the sheet and cutting data. Individual control mode programs are accessed from a Main Menu screen. There are several basic operations utilized in the control of the device.

The first such operation is the fence reset. After the opening screen, reset of the system is required to confirm the home fence position and self test the hardware and software. The reset function causes each fence to sweep across the full width of the tables, testing the operation of the end-of-travel limit switches and calibrating the positive home position. Only after this procedure has been completed can each fence be used for accurate cutting purposes. The reset mode is also called when the movement of the fence has been cancelled by an emergency stop during its regular operation. An emergency stop is caused by a am and stalls the fence movement.

The second preprogrammed operation is providing an exact baseline calibration of the system. This program is necessary to provide a means of setting a baseline distance from the saw blade to the fence bar. After program selection from the Main Menu screen, a screen which provides for manual movement of the fence at high or low speed is displayed. Arbitrary manual moves are made through selection of the directional arrow keys. Once a baseline distance is established, a second screen, displaying whole and fraction numeral keys, permits the operator to install the referenced distance into the control program logic. The program then establishes the reference distance from the home position to the current fence position. Once these distances are established, the fence may be moved within the limit of the working range, and can be adjusted relative to two baseline points of reference.

Moves of the fences may be performed under manual control of the stepper motor. The program logic directs the motor to turn at a continuous rate of speed until the stop command is given by the saw operator. A low speed selection key group provides jogging speed for fine manual adjustments of the fence bar. After a position has been selected, the decimal dimension position is reported on the screen.

When a single cut is intended to be made, the single cut mode program is selected. A screen displaying whole numerals (0-9) and fractional numerals (1/32 through 31/32 in 32 inch increments) is presented for the operator to install the cutting dimension. The operator is permitted to select whole number combinations less than the maximum cutting capacity of the saw, and may install one fraction used either in conjunction with the whole numbers or standing alone. As keys are selected, the color of the key changes to confirm the selection.

At the end of the selection process, the "Enter" key is pushed. This loads the dimension into the control program. If the wrong dimension is selected and entered, a clear operation is provided, the dimension box is cleared, and another dimension can be selected.

Once the proper dimension is loaded, the position key is actuated from the touchscreen and the fence moves to its preselected position.

If a problem arises during the move which requires an emergency stop, the "Cancel" key may be pushed. This immediately kills the program and stops the movement of the fence. Following this selection, the operator must reset the fence through use of the reset command and return to the single cut mode through selection of the various menu keys.

During regular operation, once a position has been selected, the operator may enter the next dimension to be cut by simply touching the numeral keys to adjust the fence to the next dimension. The regular position response would follow after sequencing through the enter and position keys.

Multiple cuts may also be performed under user command. This process is very similar to the single cut mode, with the added option of stacking a series of dimensions for sequence cutting. This offers a time savings to the operator when cutting panel parts, by allowing him to enter a series of cuts as indicated on a cutlist or graphics representation of a panel. After completing the entering operation, the program displays the stack of dimensions and highlights the selected cutting dimension and/or fence position. Arrow keys move the highlight bar to a new dimension for selection of any dimension within the stack. The "Position" key moves the fence to the selected position.

Touching the "Position" key again moves the highlight bar the next dimension down the list and positions the fence to this prescribed location.

A cancel operation is also included in the screen format and operates in the same manner as described in the single cut section.

All screens include the option of sending the fences to the home position. This position is located to the extreme away location with relation to the blade. This operation would be selected when the operator needs to have the fences out of the way during cutting operations or when changing blades. Each mode screen also contains an "End" key which returns the operator to the main menu.

A number of sheet cutting optimization programs are available commercially as software packages for use with a personal computer. One of these programs is Cut Planner 2A by Pattern Systems International. This program permits the user to enter the size of a given sheet and the sizes of a number of pieces to be cut from that sheet. Furthermore, the program provides the capability for entering an inventory of different or similarly sized sheets and the selection and use of those sheets for cutting the preselected pieces. The program will indicate whether or not enough sheet material exists in inventory to fulfill the complete cutting scheme. The cutting scheme is designed to minimize the waste of the sheets after cutting. The pieces are arranged on the sheets and the patterns are identified so that the cutter may select a given pattern and be instructed as to the cuts necessary to extract the cut panels from that sheet. This program is generally adapted to provide a hard copy report to the user which is then used by the saw operator. The output of this program may, however, be obtained in an ASCII database file. The ASCII file contains a header containing project information for each set of sheets to be cut. The header also contains a series of data entries which identify the various cuts which must be made in the various patterns to achieve the total cutting scheme. This data is generally arranged in an organized and consistent format such that it may be extracted by a second program which can then format the data into a cutting list and graphical information.

The computerized cutting device adopts this data and utilizes it to provide an on-screen listing and graphical representation of the patterns to be cut by the user as shown in FIG. 5. Once the user has selected a given project under the program cutting mode, a certain pattern is identified for cutting. The patterns are generally classified by their initial cut as to whether the cuts will be made primarily in a rip orientation or primarily in a crosscut orientation. This is indicated in the display header 140. All of the cuts are graphically displayed on a diagrammatic representation 145 of the entire pattern. Additionally, each cut 150 is identified by its location on the sheet in a cutting list 155 shown adjacent the diagram on the touchscreen. A parts inventory 160 may also be displayed.

As the user begins cutting, he selects the first cut from the list shown on the screen. The cut is then highlighted in color on the list and is also highlighted on the graphic representation adjacent thereto. The user then knows both from his knowledge of cutting, but more importantly, from a visual inspection of the sheet, whether he is cutting in the correct place.

Simultaneously with the display of this information on the touchscreen, the crosscut and rip fences are automatically moved by the stepper motors under the program control to a position that will allow the cutting of the identified cut on the identified pattern. The user must therefore only insert the sheet properly with relation to the fence to obtain a complete and accurate cut.

Once the cut has been performed, the user selects the next cut from the menu. The previous cut is highlighted in a second color to indicate the completion of the cut and the next cut is now highlighted with the cutting color. The menu listing of the cut to be performed is also highlighted. In this fashion, the user may progress from the first cut to the last while continuously viewing a graphical representation of the sheet he is cutting. This graphical representation minimizes mistaken cuts made at improper locations on the sheet. Furthermore, the automatic movement of the fences speeds the adjustment time needed to set the table saw up for each cut and furthermore reduces mistaken cutting by improper placement of the various fences.

I claim:

1. A power saw of the type having a tabletop cutting surface, a cutting blade mounted thereon, the power saw comprising:
   (a) at least one motor driven fence adjustably mounted to sequentially position workpiece with respect to the cutting blade;
   (b) controller means connected to said motor driven fence for controlling and indexing the movement thereof;
   (c) data input means for receiving cutting instructions from a user;
   (d) processor and memory means connected to said controller means and said data input means for compiling an optimum cut sequence and cut pattern for said workpiece from said instructions, and sequentially positioning said motor driven fence according to said optimum cut sequence as prompted by said user through said data input means; and
   (e) display means connected to said processor and memory means for displaying said optimum cut sequence and cut pattern in a graphic format.

2. A power saw as described in claim 1 wherein the motor driven fence is further comprised of a support rod, a stepper motor engaging said support rod, a housing enclosing said stepper motor which is adapted to slide along the support rod and a fence bar slidably mounted on said housing.

3. A power saw as described in claim 2 wherein the support rod further comprises a precisely machined series of teeth and the stepper motor further comprises a toothed gear which is adapted to engage the teeth of the support rod wherein the movement of the housing along the rod is accomplished by the rotation of the stepper motor gear against the teeth of the support rod.

4. A power saw as described in claim 1 wherein the motor driven fence is further comprised of a support rod, a fence housing slidably mounted on said support rod, a fence bar mounted on said support housing, a stepper motor which is adapted to drive a pair of toothed pulleys and a ribbed belt extending between said tooth pulleys and affixed to said housing wherein the rotation of said stepper motor and said toothed pulleys results in the longitudinal movement of said housing along said support bar.

5. A power saw as described in claim 4 wherein said ribbed belt is elastic.

6. A power saw as described in claim 3 wherein said fence bar is pivotably mounted to said housing.

7. A power saw as described in claim 1 wherein said power saw further comprises a sliding platform surface affixed in close proximity to said cutting blade wherein a work piece laid on said sliding platform may be moved in conjunction with said sliding platform relative to said blade.

8. A power saw as described in claim 7 wherein at least one of said motor driven fences is mounted on said sliding platform.

9. A power saw as described in claim 1 wherein at least one of said motor driven fences is mounted directly to said power saw.

10. A power saw as described in claim 1 wherein data input means is a keyboard.

11. A power saw as described in claim 1 wherein said data input means is touchscreen.

12. A power saw as described in claim 1 wherein said processor and memory means is a personal computer.

13. A power saw as described in claim 12 wherein said processor and memory means are connected to said controller means by means of an RS232 serial connection.

14. A power saw as described in claim 1 wherein said optimum cut sequence is determined from said data input, said data input comprising an inventory of sheet stock and a list of finished pieces to be extracted therefrom.

15. A power saw as described in claim 14 wherein the output of said optimum cut sequence is in the form of a list of cuts.

16. A power saw as described in claim 15 wherein said list of cuts is displayed both as a textual list and in the form of a graphical diagram.

17. A power saw as described in claim 16 wherein said graphical diagram is in the form of the sheet stock to be cut, the cut to be made shown as lines on the face of said sheet, the lines denoting finished cut components.

18. A power saw as described in claim 17 wherein said finished cut components are numbered, said numbers corresponding to numbers assigned to textual descriptive material on the display means.

19. A power saw as described in claim 17 wherein cuts which are to be made are displayed in a first color and cuts which have already been made are displayed in a second color.

20. A power saw as described in claim 1 wherein said optimum cut sequence and cut pattern are displayed on said display means and the user may select a particular cut by touching an identified portion of the screen corresponding to that cut.

21. A power saw as described in claim 20 wherein the selection of a cut from the graphical representation on the screen causes at least one of the motor driven fences to move to a position corresponding to that cut.

22. A power saw as described in claim 21 wherein the selection of a particular cut causes that cut to be highlighted on the screen in a first color.

23. A power saw as described in claim 22 wherein the user may select a second cut from the optimum cutting list and cut pattern and said second cut is then highlighted in the first color and the first cut is highlighted in a second color, said second color indicating that said first cut has been accomplished.

24. A power saw as described in claim 23 wherein selection of said second cut causes at least one of said motor driven fences to move to a second position corresponding to said second cut.

25. A power saw as described in claim 1 wherein said at least one motor driven fence comprises a housing member and a fence member slidably affixed thereto, said fence member further comprising a locking means to permit said sliding fence member to be fixed in a given position with relation to said housing member.

26. A power saw as described in claim 1 wherein said at least one motor driven fence is limited at the ends of its travel by physical stops.

27. A power saw as described in claim 1 wherein said at least one motor driven fence further comprises at least one electrical limit switch which when moved from an operating position to a stop position by engagement with a movable fence housing causes said motor driven fence to discontinue operation.

28. A power saw as described in claim 1 wherein said at least one motor driven fence further comprises a limit switch which enables that motor driven fence to locate and position itself at a home position.

* * * * *